US008668794B2

(12) United States Patent
Yu et al.

(10) Patent No.: US 8,668,794 B2
(45) Date of Patent: Mar. 11, 2014

(54) MIXING BONDING ADHESIVE AT DIE BONDER BEFORE DISPENSE

(75) Inventors: Frank Yu, Taipei (TW); Eric Hsieh, Taipei (TW); Kevin Jin, Taipei (TW)

(73) Assignee: Texas Instruments Incorporated, Dallas, TX (US)

( * ) Notice: Subject to any disclaimer, the term of this patent is extended or adjusted under 35 U.S.C. 154(b) by 291 days.

(21) Appl. No.: 13/020,311

(22) Filed: Feb. 3, 2011

(65) Prior Publication Data

US 2012/0199285 A1 Aug. 9, 2012

(51) Int. Cl.
*B32B 41/00* (2006.01)

(52) U.S. Cl.
USPC ........... 156/64; 156/325; 156/327; 427/427.2

(58) Field of Classification Search
USPC ............ 156/64, 327, 578, 325; 118/665, 612; 427/427.2
See application file for complete search history.

(56) References Cited

U.S. PATENT DOCUMENTS

2004/0069801 A1* 4/2004 Sasaguri et al. .............. 222/135

FOREIGN PATENT DOCUMENTS

KR 20020052580 7/2002

* cited by examiner

*Primary Examiner* — George Koch
(74) *Attorney, Agent, or Firm* — Steven A. Shaw; Wade James Brady, III; Frederick J. Telecky, Jr.

(57) ABSTRACT

A method for die bonding includes positioning a dispenser in a die bonding apparatus, wherein the dispenser includes a reservoir having bonding adhesive therein including particles and a liquid carrier. The dispenser is moved to provide mechanical agitation to the dispenser for mixing the bonding adhesive into a homogeneous mixture of particles and the liquid carrier, wherein the bonding adhesive is not dispensed during moving. After the moving, the bonding adhesive is dispensed onto a bonding location on the workpiece without removing the dispenser from the die attach apparatus. An integrated circuit (IC) die is attached onto the bonding adhesive over the bonding location. The method can also include determining an amount of time elapsed after the last mixing of the bonding adhesive or the positioning of the dispenser in the die bonding apparatus, and automatically initiating movement for mixing only if the elapsed time exceeds a predetermined time.

9 Claims, 2 Drawing Sheets

MIXING BONDING ADHESIVE AT DIE BONDER BEFORE DISPENSE

FIELD

Disclosed embodiments relate to semiconductor package production, more specifically to die bonding.

BACKGROUND

As known in the art, an integrated circuit (IC) die is attached to a workpiece such as a package substrate, lead frame or a carrier during packaging of IC devices. The package substrate or carrier is generally made of an electrically insulating (i.e., dielectric) material, for example, ceramic or plastic. The process by which the IC die is attached to the workpiece is known as die bonding. There are different techniques of die bonding including, for example, eutectic bonding, preform bonding, and adhesive bonding.

Adhesive bonding includes using an adhesive paste, also known as a die attach or die bonding adhesive, to attach the IC die to a workpiece. The bonding adhesive can be dispensed on the workpiece and the IC die placed over it. The adhesive may include an epoxy monomer or another suitable liquid carrier, and generally includes a suspension of filler particles such as metal filler particles in the carrier. As known in the chemical arts, a suspension is a heterogeneous fluid containing solid particles that are sufficiently large (generally at least 1 µm in size) for sedimentation. The internal phase (solid) is dispersed throughout the external phase (liquid) through mechanical agitation for mixing before loading into the die bonder. Unlike colloids, suspensions have the tendency to settle over a period of time which results in separation of the solid particles and the liquid.

The metal particles can be silver particles, although other metals or electrically conductive materials may be used, e.g., gold, nickel, copper, or graphite, etc. It is generally desirable to load the metal particle content as high as possible in order to obtain the highest possible thermal and electrical conductivity. The particles are generally denser as compared to the liquid carrier. Following die attach, a heated curing step is generally used that polymerizes the liquid carrier. Curing the carrier provides adhesion to make a bond to both the IC and the workpiece with the required mechanical strength, and the metal particles provide electrical or/and thermal conductivity. The adhesive can thus be electrically conductive or non-conductive, and thermally conductive or non-conductive.

In a known technique of adhesive bonding for an adhesive comprising metal filler particles in a carrier, the uncured adhesive is mixed well while in the dispenser which includes a reservoir for the bonding adhesive by mechanical agitation provided by a stand-alone mixer, such as a combined centrifuge mixer, to resuspend the filler to provide a homogeneous, uniform suspension. After mixing, the dispenser is then secured to the die bonder apparatus. While in the die bonder apparatus the suspension is then injected from the dispenser onto the workpiece, which is followed by attachment of the IC die. The dispenser may include a syringe having an end aperture.

During normal production, the metal or other particles tend to remain in suspension because dispensing includes some X-Y motion which helps prevent precipitation so that separation of the denser filler particles that can otherwise cause delamination of the die attach adhesive from the IC device is typically not a significant problem. As a method of process control, X-ray inspection can be used after die bonding to check for delamination.

SUMMARY

Disclosed embodiments recognize that for particle filled carrier-based die bonding adhesives, the relatively dense particles (e.g., metal particles) may separate and settle down into the bottom of the dispenser (e.g., syringe) due to gravity over a period of time, rendering the adhesive non-homogeneous, which can cause delamination between the integrated circuit (IC) die and the workpiece in the semiconductor IC package. For example, if an abnormality (e.g., index jam due to leadframe warpage, a lead frame load or unload issue due to a mechanical problem, alignment failure on dispensing/bonding/wafer area, die pick up failure, etc.) happens on the die bonder, the abnormality can cause a long idle time without any dispensing, such as one hour or more. The rate of separation increases as the particle loading increases, which can aggravate the delamination problem. Although delamination may be detected using conventional X-ray inspection after die bonding, one of the drawbacks of X-ray inspection is that the inspection does not address the root cause, i.e., the separation of the particles in the carrier (e.g., epoxy).

Disclosed embodiments add mechanical agitation while the die bonding adhesive is in the dispenser and while the dispenser is within the die attach apparatus before dispensing so that the die bonding adhesive as dispensed on the bonding sites stays within a specified homogeneity. The mechanical agitation thus reverses separation of the denser particles (e.g., metal particles) from the carrier to address the root cause of the delamination problem by keeping the bonding adhesive well mixed before dispensing.

An example method for die bonding comprises positioning a dispenser in a die bonding apparatus, wherein the dispenser includes a reservoir having bonding adhesive therein comprising particles and a liquid carrier. The dispenser is moved to provide mechanical agitation to the dispenser for mixing the bonding adhesive into a homogeneous mixture of particles and liquid carrier, wherein the bonding adhesive is not dispensed during moving. After the moving, the bonding adhesive is dispensed onto a bonding location on the workpiece without removing the dispenser from the die attach apparatus. An IC die or die stack is attached onto the bonding adhesive over the bonding location. The method can also include determining an amount of time elapsed after the last mixing of the bonding adhesive or the positioning of the dispenser in the die bonding apparatus, and automatically initiating moving of the dispenser to provide mixing only if the elapsed time exceeds a predetermined time.

An example die bonding apparatus comprises a moveable dispenser assembly including at least one dispenser having a reservoir for holding a bonding adhesive comprising particles and a fluid carrier. The dispenser is for dispensing a volume of bonding adhesive onto a surface of a workpiece in the bonding location. Movement of the moveable dispenser assembly provides mechanical agitation to the dispenser for mixing the bonding adhesive into a homogeneous mixture of the particles and liquid carrier. An opening at an end of the dispenser is for dispensing the bonding adhesive to the surface of the workpiece for attaching an IC die or die stack. At least one controller is provided for sending a control signal that triggers movement of the moveable dispenser assembly for mixing the bonding adhesive before dispensing the volume of bonding adhesive onto the surface of the workpiece.

DETAILED DESCRIPTION

Figure 1:
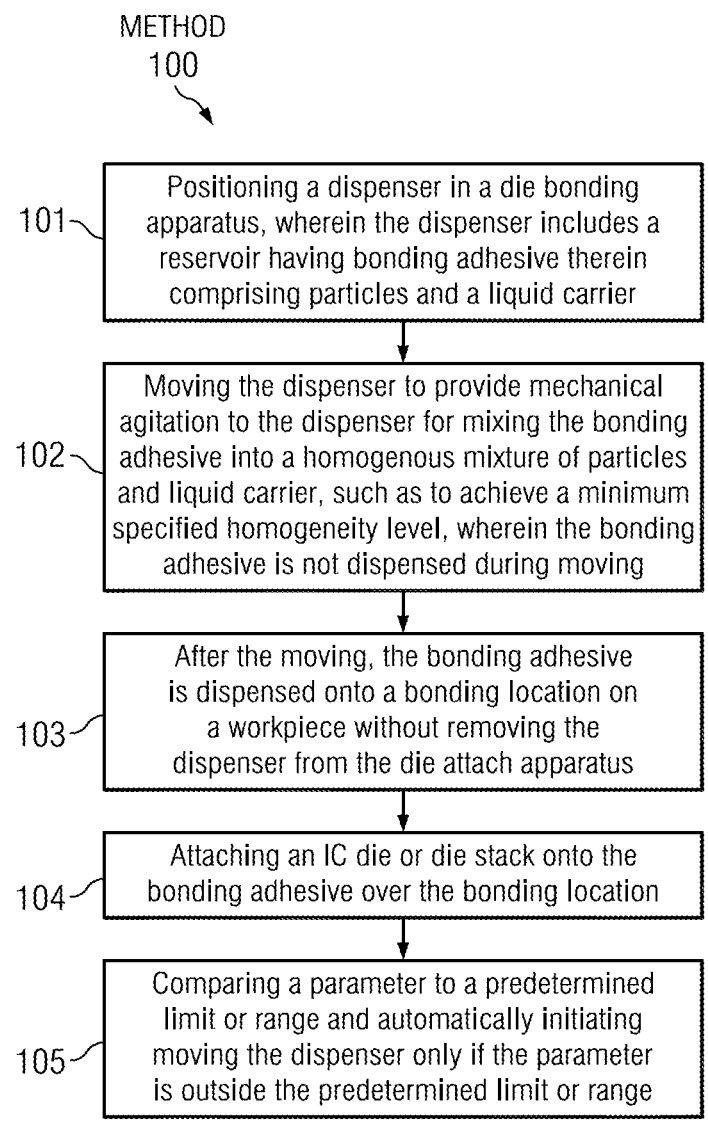
FIG. 1 is a flow chart that shows steps in an example method for die bonding including moving a dispenser having bonding adhesive therein before dispensing, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

FIG. 1 is a flow chart that shows steps in an example method 100 for die bonding including moving a dispenser having bonding adhesive therein before dispensing, according to an example embodiment. Step 101 comprises positioning a dispenser in a die bonding apparatus, wherein the dispenser includes a reservoir having bonding adhesive therein comprising particles and a liquid carrier. The dispenser is generally secured to a moveable dispenser assembly, such as an X-Y table. The dispenser can comprise a syringe including an opening on an end that dispenses the bonding adhesive upon application of an applied dispensing pressure.

The particles can comprise electrically conductive, semiconductor or dielectric particles, or mixtures thereof. The bonding adhesive can also be referred to as die attach adhesive. The bonding adhesive may be a paste including an epoxy as a liquid carrier (e.g., epoxy bonding). In one embodiment, the bonding adhesive comprises a paste including epoxy and the particles comprise silver particles suspended in the paste. The adhesive may alternatively include another suitable liquid carrier, for example, silicone, polyurethane, or cyanoacrylate. The particles are generally sufficiently large (generally at least 1 µm in size) for sedimentation, such as silver particles averaging several µms in size in a solvent. The carrier provides adhesion and cohesion between the die and the substrate. Metal particles can provide electrical and/or thermal conductivity. The adhesive can be an electrically conductive silica-filler or an insulating silica-filler. Silver particles can be used when both good electrical connection and good thermal performance are desired since they provide both good electrical and thermal conductivity.

Step 102 comprises moving the dispenser to provide mechanical agitation to the dispenser for mixing the bonding adhesive into a homogeneous mixture of particles and liquid carrier, such as to achieve a minimum specified homogeneity level, wherein the bonding adhesive is not dispensed during moving. The moving can be a shaking or oscillation, or an X-Y movement pattern analogous to the movement used to pattern the bonding adhesive during dispense, or other movement pattern that enables obtaining a minimum specified homogeneity level. The moving can be performed continuously after the dispenser is positioned in the die bonding apparatus, before dispensing is initiated. In one embodiment the mixing provided by step 102 is sufficient to allow the conventional mixing in a stand along centrifugal mixer or other mixer before loading the dispenser in the die bonding machine to be eliminated.

In step 103, after the moving, the bonding adhesive is dispensed onto a bonding location on a workpiece without removing the dispenser from the die attach apparatus. The bonding adhesive is dispensed in a pattern and volume appropriate for the die size. The workpiece, is moved from an input position to the bonding location sometimes referred to as the dispense position. The workpiece can comprise a package substrate, such as a ceramic or organic substrate, lead frame, or a carrier.

Step 104 comprises attaching an IC die or die stack onto the bonding adhesive over the bonding location. For example, a pattern recognition system can locate a good die on a sawn wafer. A vacuum pick-up tool mounted on a bond head can grab the aligned good die from the wafer and place it on a programmed and pre-dispensed bonding location on the workpiece.

Optional step 105 comprises comparing a parameter to a predetermined limit or range, and automatically initiating moving the dispenser only if the parameter is outside the predetermined limit or range. In one embodiment the parameter comprises an amount of elapsed time after the last moving of the dispenser or the positioning of the dispenser in the die bonding apparatus, wherein moving is performed only if the elapsed time exceeds a predetermined time. In one particular embodiment the predetermined time is at least one hour. In another embodiment, the parameter comprises a measure of homogeneity (e.g., a specific homogeneity) of the bonding adhesive, wherein the moving is performed only if the measure of homogeneity is below a minimum specified homogeneity level.

Figure 2:
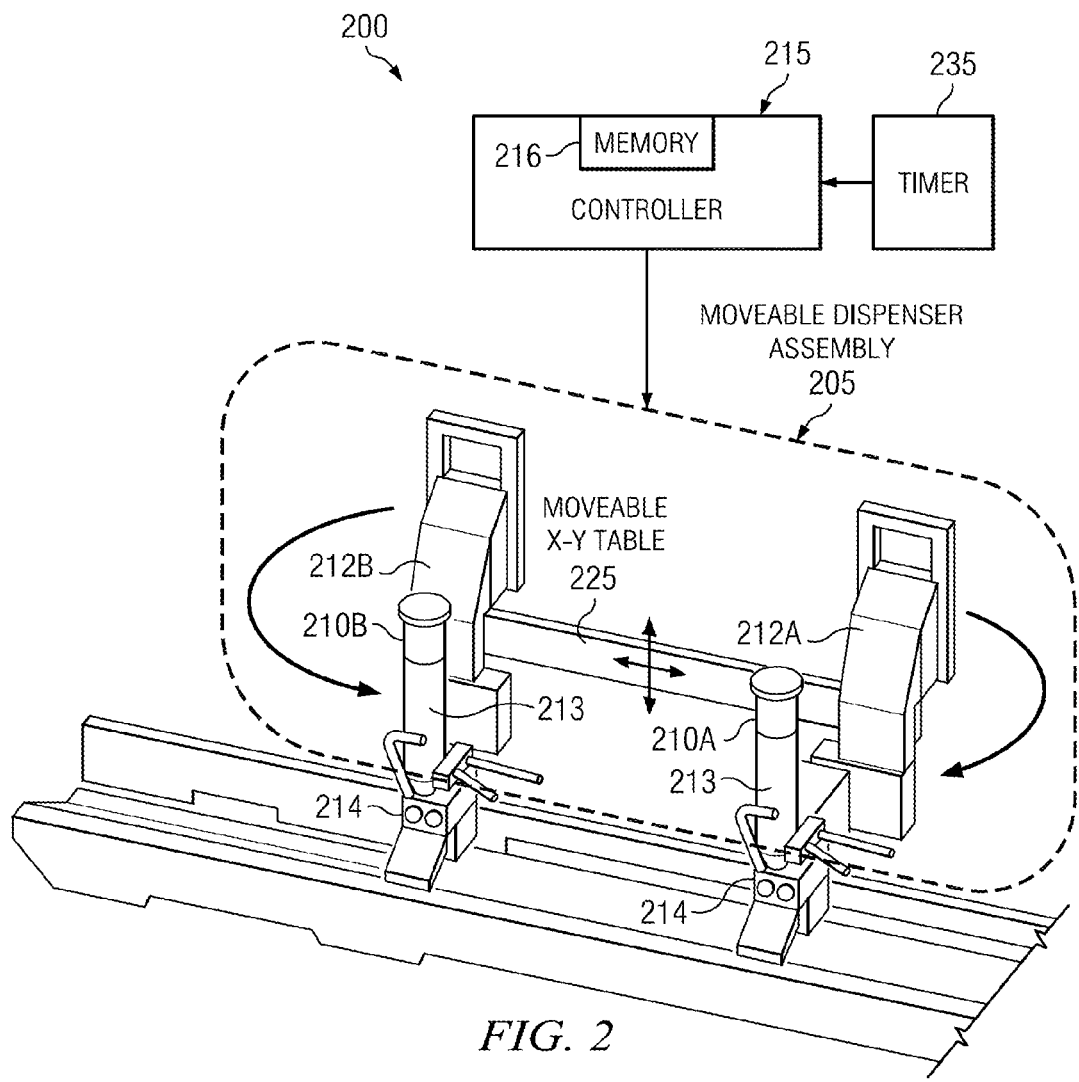
FIG. 2 illustrates a portion of an example die bonding apparatus that comprises a moveable dispenser assembly for moving a dispenser having bonding adhesive therein before dispensing, according to an example embodiment.

FIG. 2 illustrates a portion of an example die bonding apparatus 200 that comprises a moveable dispenser assembly for moving a dispenser having bonding adhesive therein before dispensing, according to an example embodiment. The moveable dispenser assembly 205 includes a main dispenser 210A positioned in a main dispenser holder 212A and an optional auxiliary dispenser 210B positioned in an auxiliary dispenser holder 212B. The dispensing holders 212A, 212B are secured to a moveable X-Y table 225. The dispensers 210A, 210B include a syringe having a reservoir 213 and an opening (aperture) 214 on an end.

Although two dispensers 210A, 210B are shown in FIG. 2, only one dispenser is generally needed to practice the embodiments described herein. Multiple dispensers can increase the UPH (Units Per Hour)/productivity of the die bonding apparatus 200 when the bottleneck of the die bonding apparatus is at dispensing, as opposed to die mounting. For example, large die size can result in the bottleneck at dispensing, since it will take more dispensing time to complete an adhesive pattern. Multiple dispensers can also provide different adhesive compositions (e.g., different epoxy types) on a single die pad. The main dispenser 210A and the auxiliary dispenser 210B include a bonding adhesive that can be injected onto a workpiece to attach an IC die to the workpiece, such as a ceramic or organic substrate or leadframe.

As described above, the bonding adhesive can become a non-homogeneous, non-uniform composition over time due to separation of the suspension into denser particles from the less dense liquid carrier. The moveable dispenser assembly 205 is designed to be moveable for moving and positioning the main dispenser 210A and the auxiliary dispenser 210B for dispensing the bonding adhesive to attach the IC die and workpiece under control of a controller 215 that is communicably coupled to components in the die bonding apparatus 200 including the moveable dispenser assembly 205. For example, the moveable dispenser assembly 205 can be controlled to provide movement including oscillation or rotation of the main dispenser 210A and the auxiliary dispenser 210B. The oscillation, rotation or other movement can be initiated and controlled by the controller 215. The oscillation or rotation of the main dispenser 210A and the auxiliary dispenser 210B generates a centrifugal force and a centripetal force on the main dispenser 210A and the auxiliary dispenser 210B so as to shake the dispensers 210A and 210B. The movement of the dispensers causes mixing of the adhesive in the main dispenser 210A and the auxiliary dispenser 210B to ensure a specified homogeneity level for the bonding adhesive before dispensing for attaching the IC die and the workpiece. Software or firmware of the controller 215 can be configured to provide for control of movements such as oscillations, e.g., automatic periodic oscillations, to keep the bonding adhesive well mixed.

According to one embodiment, the main dispenser 210A and the auxiliary dispenser 210B are filled with adhesive including particles. The main dispenser 210A and the auxiliary dispenser 210B are then positioned in the main dispenser holder 212A and the auxiliary dispenser holder 212B, respectively, and movement such as oscillation is applied to the moveable dispenser assembly 205 to pre-mix the adhesive in the main and auxiliary dispensers, 210A, 210B, before dispensing or injecting the bonding adhesive. According to one embodiment, the oscillation is applied periodically, before dispensing, after the lapse of a predetermined elapsed time interval after the dispenser has been positioned in the moveable dispenser assembly. The timer 235 can measure the time parameter.

The time interval is a function of keeping the adhesive well mixed so as to not have settling of the metal or other particles prior to dispensing that might cause the delamination. The predetermined time interval may be a function of the particular adhesive and/or particles, and concentration of metal particles employed. The predetermined time for different bonding adhesives can be determined through simulation or empirically and stored in a memory 216 associated with the controller 215. The controller 215 is coupled to the moveable dispenser assembly 205 and software running in the controller can control the oscillation of the moveable dispenser assembly based on the predetermined time for the different bonding adhesives stored in the memory 216.

For example, the time period might be one, two to three hours for certain adhesives, and vary from this range for others. The oscillating is done for a sufficient period of time to ensure the adhesive is well mixed to achieve a minimum level of homogeneity. For example, the moving such as oscillating may be done for about a minute for certain adhesives, and vary from a minute for others. Referring to the time period after the dispenser has been positioned in the moveable dispenser assembly and before the dispensing, this time period may also be referred to as an idle time for the production system. According to another embodiment, the oscillation is performed continuously after the dispenser has been operably placed in the dispenser holder, before dispensing is initiated.

Although not shown in FIG. 2, die bonding apparatus 200 can include an optical system for monitoring the physical stability of the suspension real-time while the bonding adhesive is in the dispensers 210A, 210B, and can use this information to know when to initiate moving the dispenser to accomplish mixing, and stop mixing some time after initialization. Multiple light scattering coupled with vertical scanning is a method that can be used to monitor the dispersion state of a bonding adhesive. When light is sent through the bonding adhesive, it is backscattered by the particles. The backscattering intensity is directly proportional to the size and volume fraction of the dispersed phase. Therefore, local changes in concentration (sedimentation) and global changes in size (flocculation, aggregation) can be detected, monitored and quantified.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

What is claimed is:

1. A method for die bonding, comprising:
    positioning a dispenser in a die bonding apparatus, wherein said dispenser includes a reservoir having bonding adhesive therein comprising particles and a liquid carrier;
    comparing a parameter to a predetermined limit or range;
    moving said dispenser to provide mechanical agitation to said dispenser for mixing said bonding adhesive into a homogeneous mixture of said particles and said liquid carrier if said parameter is outside said predetermined limit or range, wherein said bonding adhesive is not dispensed during said moving;
    after said moving, dispensing said bonding adhesive onto a bonding location on a workpiece without removing said dispenser from said die attach apparatus, and
    attaching an integrated circuit (IC) die onto said bonding adhesive over said bonding location.

2. The method of claim 1, wherein said particles comprise electrically conductive particles.

3. The method of claim 2, wherein the bonding adhesive comprises a paste including epoxy and said electrically conductive particles comprise metal particles suspended in said paste.

4. The method of claim 1, wherein said dispenser includes a syringe including an opening at an end that dispenses said bonding adhesive upon application of an applied dispensing pressure.

5. The method of claim 1, wherein said parameter comprises an amount of elapsed time after said dispenser has been last moved or when said dispenser was positioned in said die bonding apparatus, and wherein said moving is performed only if said elapsed time exceeds a predetermined time.

6. The method of claim 5, wherein the predetermined time is at least one hour.

7. The method of claim 1, wherein said parameter comprises a measure of homogeneity of said bonding adhesive, and wherein said moving is performed only if said measure of homogeneity is below a minimum specified homogeneity level.

8. The method of claim 1, wherein said moving said dispenser comprises oscillating.

9. The method of claim 1, wherein said moving is performed continuously after said dispenser is positioned in said die bonding apparatus, before said dispensing is initiated.

* * * * *